Sept. 7, 1943.                A. E. NORLING                    2,328,993
                              BAIT CONTAINER
                           Filed Sept. 2, 1942            2 Sheets-Sheet 1
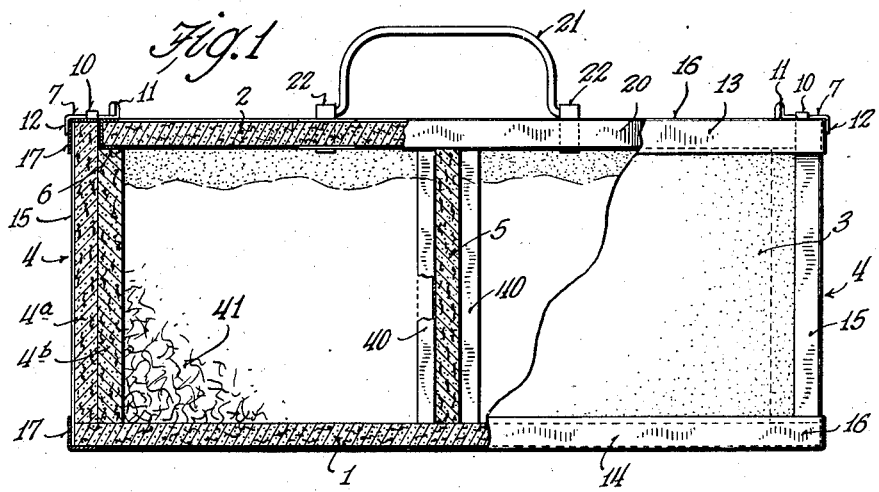
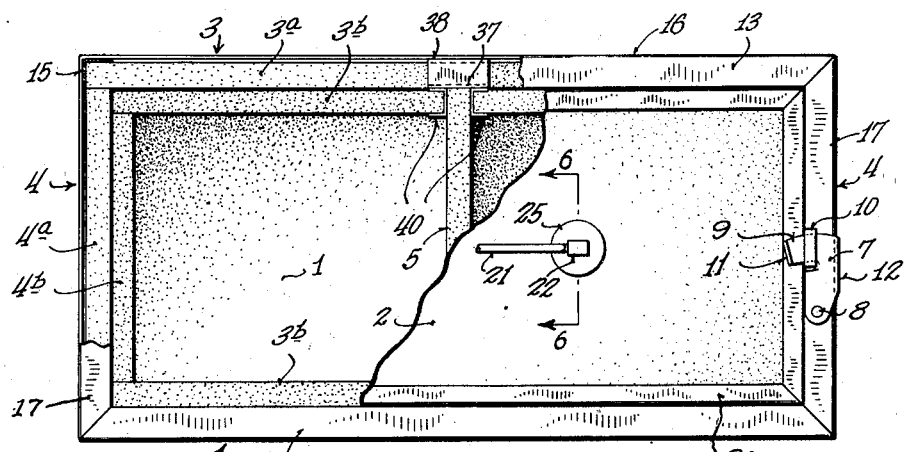
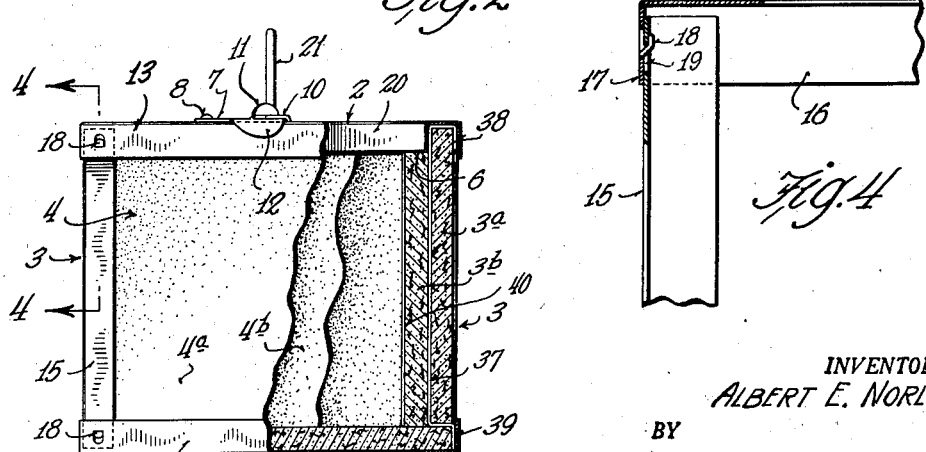
INVENTOR.
ALBERT E. NORLING
BY
ATTORNEY.

Sept. 7, 1943.   A. E. NORLING   2,328,993
BAIT CONTAINER
Filed Sept. 2, 1942   2 Sheets-Sheet 2
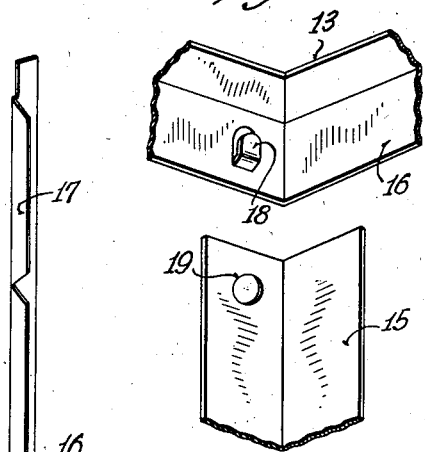
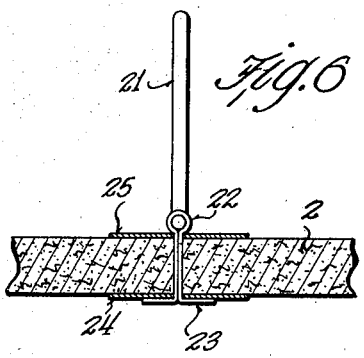
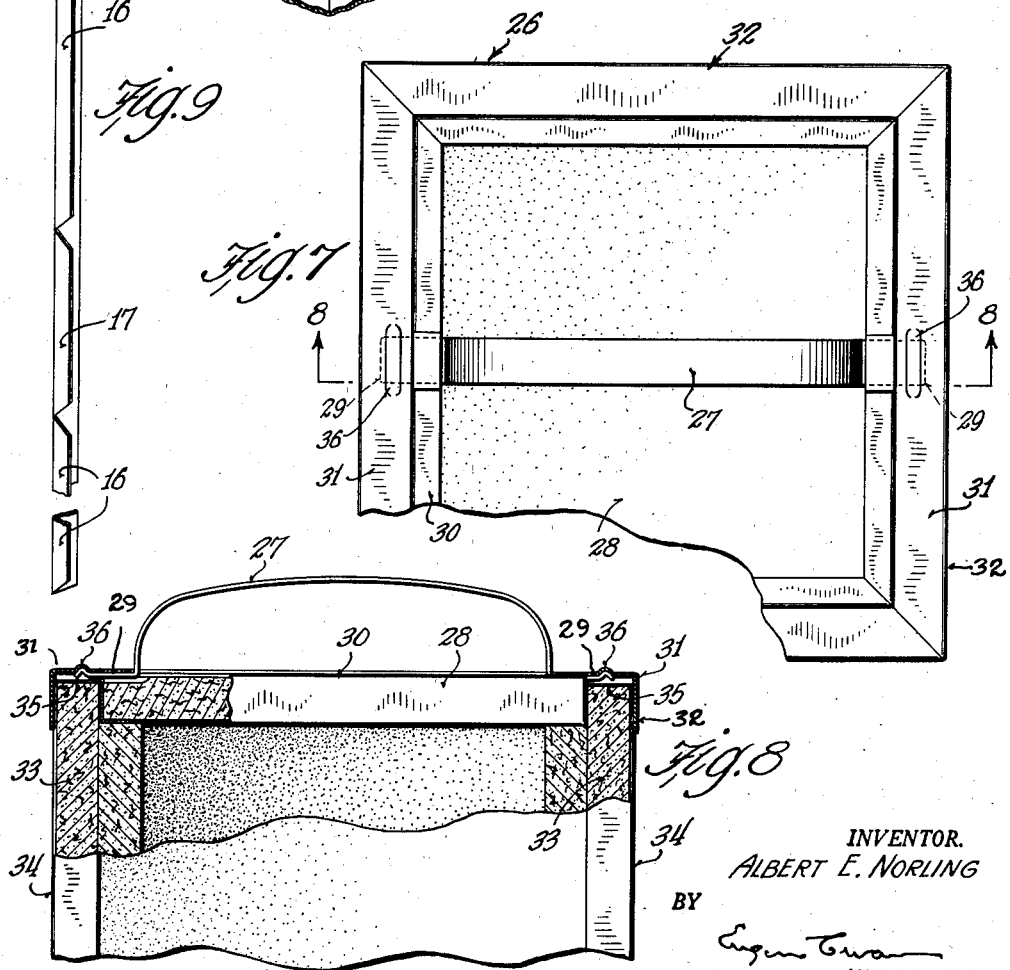
INVENTOR.
ALBERT E. NORLING
BY
ATTORNEY.

Patented Sept. 7, 1943

2,328,993

UNITED STATES PATENT OFFICE 2,328,993

BAIT CONTAINER

Albert E. Norling, Oberlin, Ohio

Application September 2, 1942, Serial No. 457,002

10 Claims. (Cl. 43—55)

This invention relates to a live bait container for fishermen.

The principal object and purpose of my invention is to provide a convenient and readily handable and portable bait container for keeping fishworms, night crawlers or dewworms, soft shelled crabs and similar bait alive for long trips and extended periods. The container of my invention keeps the bait in perfect condition even in the hottest weather and is sturdily bound with a metal frame to withstand rough handling and abuse.

In carrying out the objects of my invention, I provide a container or box of the desired dimensions having a wall structure comprised of a self sustaining, water absorbent, porous, fibrous material exposed to the bait receiving compartment within the container and on the exterior of the container, whereby the evaporation of moisture from the container walls, when wetted, serves to maintain the compartment and its contents relatively cool and moist to keep the bait alive and in good condition over relatively long periods. The fastenings for the frame do not extend through the container walls and heat is not conducted into the bait compartment to damage the bait therein. I also provide a moisture absorbent moss material loosely packed within the container compartment to provide a habitat for the bait.

A further object of my invention is to provide certain of the container walls of an increased thickness or double or multiple layer construction to serve as a reservoir for holding a sufficient quantity of moisture for keeping the bait alive over long periods without too frequent re-wetting of the container.

A further object of my invention is to provide the supporting frame in skeleton form to expose the container walls for evaporation of the moisture therefrom.

A further object of my invention is to provide a novel form of fastening for the cover and in some instances employ the handle member for the container as a part of the fastening device.

A further object of my invention is to provide an interlocking tongue and aperture arrangement for securing the frame parts together to avoid the use of fasteners extending through the container walls to conduct heat into the bait compartment.

The invention consists further in the features of construction hereinafter described and claimed.

In the accompanying drawings—

Fig. 1 is a side view with parts broken away and in section, respectively, of my improved bait container;

Fig. 2 is a top plan view of the container with the cover broken away and parts in section to illustrate details of the construction;

Fig. 3 is an end view of the container with parts broken away and in section, respectively, for the same purpose;

Fig. 4 is an enlarged vertical sectional view taken on line 4—4 of Fig. 3 to show the interlocking tongue and aperture connection employed in the supporting frame;

Fig. 5 is a perspective view illustrating this connection;

Fig. 6 is a sectional view taken on line 6—6 of Fig. 2 to show the manner in which the bail handle of Figs. 1 to 3 is attached to the container cover;

Fig. 7 is a fragmentary top plan view of a container equipped with a handle member which also serves as a part of the cover fastener;

Fig. 8 is a sectional view taken on line 8—8 of Fig. 7; and

Fig. 9 shows the strip form of the frame sections to be later described.

As shown in the drawings, the bait container of my invention comprises a box-like structure having a bottom wall 1, a top wall in the form of a removable cover 2, and upright side and end walls 3, 3 and 4, 4, respectively, as shown in Figs. 1 to 3. The side and end walls are each comprised of a double or multiple layer construction to serve as a reservoir for holding a quantity of moisture in the container walls when wetted for the purpose heretofore mentioned.

In the embodiment shown in Figs. 1 to 3, the container compartment is divided intermediate its ends by a partition wall 5 of the same material as the container walls to provide two bait compartments to carry different kinds of bait or to separate the bait in one compartment from the bait in the other. In this way one compartment may be used before disturbing the bait in the other. It is to be understood that the container may be used without the partition wall in which event the compartment is more or less as long as the container or smaller containers with a single compartment may be provided as shown in Figs. 7 and 8. The smaller size takes less carrying space than the larger size. In the latter as shown herein the partition wall 5 is removably retained within the container in a channel mounting to be later described.

In all sizes, the wall members are made of a self sustaining fiber material such as building board obtainable on the market and having moisture absorbing and porous factors. I find that a fiber board known as "Graylite" is satisfactory or unpainted "Cellotex" can be used with satisfactory results. These materials are made from cane pulp known as bagasse. The "Graylite" board is impregnated with a small quantity of asphalt which gives it more substance when wet. The required characteristics for the fiber material are that it must be porous and moisture absorbent and under wetted conditions must retain its shape and not become limp or swell to an unusual degree. Long hard fibrous material serves this function. The material must have air cells to serve as an insulator when not loaded with water and it should have considerable resistance to organic decomposition. The present asphalt loaded material serves also to delay decomposition being slightly antiseptic and discourages mold formation.

The wall members of the container are made of this porous, fibrous moisture absorbing material. It will be noted from Figs. 1 to 3 that the side and end walls 3, 4 are each comprised of two layers of this material. Both layers abut on the upper surface of the bottom wall 1 and have surface to surface contact. They are held together by the metal frame and in the manner in which the layers are arranged in the assembled container.

It will be noted from Fig. 2 that the outer layers 3a, 3a of the side walls 3, 3 extend for the full length of the container and clamp between them the outer layers, 4a, 4a of the end walls 4, 4 at the opposite ends of the container. The same arrangement is employed for the inner layers 3b, 4b of the side and end walls, the inner layers 4b, 4b being clamped between the inner layers 3b, 3b. The wall members are held in this assembled relation by the holding frame to be presently described. In the multiple compartment container of Figs. 1 to 3, the inner layers 3b, 3b are in sections to accommodate the channel mounting for the partition wall 5.

The inner layers 3b, 4b of the respective side and end walls terminate short of the upper edges of the outer layers 3a, 4a to provide a ledge or seat 6 for the cover 2. The dimensions are such that the cover when closed is substantially flush with the top surface of the container. This enables fasteners to be extended over the upper surface of the cover to releasably lock it closed.

The fasteners in Figs. 1 and 2 are located at the opposite ends of the container and each fastener comprises a metal member 7 in the form of a latch pivoted at 8 on the associated end member of the metal frame of the container and having an integral locking tongue 9 to extend over the cover to hold it against its seat as shown in Figs. 1 and 2. The tongue 9 extends through a loop 10 struck-out from the associated frame member to hold the fastener in place. The tongue 9 has a bent-up inner end providing a stop and finger piece 11 for swinging the fastener into open position. The outer edge of the fastener 7 has a depending flange 12 providing a stop and a thumb piece to close it.

The metal frame for the container fits about its outer side and comprises upper and lower frame sections 13, 14 and connecters 15, 15 at the corners of the container. The upper and the lower frame sections are alike and the same applies to the connecters 15. The frame sections are each composed of a single metal strip of angle form in cross-section bent to fit about and embrace the respective upper and lower edge portions of the container. This provides each strip with side and end portions 16, 17 to embrace the corresponding side and end portions of the container. The vertical webs of the strips overlap the outer vertical surfaces of the container and the horizontal webs overlap the bottom wall at the lower frame section and the upper edges of the outer wall layers at the upper frame section. The horizontal webs of both frame strips are notched as shown in Fig. 9 to allow for bending of the strips and to provide miter joints at the corners of the frames. Each strip has an extended end to fit under the opposite end and be spot welded thereto for securing the frame in rigid form.

The connecters 15 also comprise angle strips to embrace the corners of the container between the frame sections 13, 14 and connect them together. The connection comprises tongues 18 struck-out from the frame strips and extending into apertures 19 in the connecter strips. This is shown in Figs. 4 and 5. In practice only eight of these connections are required, two pair at each end of the container. This provides each connecter strip 15 with two apertures 19, one at each end.

In assembling the container, the frame sections 13, 14 are interconnected with the connecter strips 15 by engaging the tongues 18 in the apertures 19 and then drawing the frame sections apart sufficiently to engage the tongues behind the connecter strips. This requires that the connecter strips 15 have a length slightly less than the height of the container so that the frame sections may be pressed against the top and bottom portions of the container after the bottom wall 1 and the outer layers 3a, 4a of the side and end walls are assembled within the frame. The tongues 18 are overlapped and held in place by the adjacent wall layers, the upper set of tongues being engaged by the ends of the outer layers 3a, 3a and the lower set of tongues being engaged by the edges of the bottom wall 1 as will be apparent from Figs. 2 and 4. The inner layers 3b, 4b are next applied and pressed in place and the container is complete as a sturdy metal bound box. The cover 2 is now seated and locked in closed position by the latches 7. The wall layers have an appreciable thickness to impart strength to the container and to absorb a sufficient quantity of water when wetted.

The cover 2 is bound about its edges with a metal binding comprising a channel strip 20 which embraces the edges of the cover to protect it and the exposed inner surfaces of the wall layers against injury as the cover is applied and removed. The strip 20 is constructed in the manner of the frame strips.

A bail handle 21 is provided for the double compartment container of Figs. 1 to 4. The bail 21 is connected to the cover by eyes or loops 22 which extend through the cover and have their inner ends clinched against the cover as at 23 with a metal wear plate 24 intervening as shown in Fig. 6. Another wear plate 25 is at the loops on the upper side of the cover to take the wear of the bail ends. When the cover is locked in closed position by the latches 7, the container may be lifted by the bail 21.

In a single compartment container as shown at 26 in Figs. 7 and 8, the bail handle 27 extends completely across the container cover 28 and has its opposite end portions 29, 29 flattened to provide latches for holding the cover closed. The end portions 29 have a sliding fit under the metal binding 30 on the cover 28 to engage under the adjacent portions 31, 31 of the upper frame section 32 of the container. The outer layers 33, 33 of the wall members 34, 34 towards which the bail extends have recesses 35, 35 to receive the ends of the bail. Here the frame members 31 have up-pressed portions 36 providing recesses to receive the beaded outer ends of the handle bail to provide sort of a snap connection preventing accidental release of the bail.

To lock the cover 28, the cover is applied with one end 29 of the bail in a recess 35. Lengthwise shifting of the bail to provide this connection withdraws the opposite end of the bail almost free of the adjacent section 31 of the container frame 32. The bail which is made of spring metal is now flexed slightly to complete the withdrawal and the cover seats in the container. The flexing pressure on the bail when released allows the bail to straighten out and project the bail end under the container frame locking the cover in place.

The mounting for the partition wall 5 comprises a pair of oppositely disposed metal plates 37, 37 applied against the inner sides of the side wall layers 3a, 3a as shown in Figs. 2 and 3. Each plate 37 extends from the top to the bottom of its wall layer and has its opposite ends bent to engage the upper and the lower edges of the wall layer. The upper end of the plate is shaped to fit over the upper edge of the wall layer as shown at 38 in Fig. 3. The lower end of the plate is off-set to extend under the lower edge of the wall layer 3a and over the outer edge of the bottom wall 1 as shown at 39 in Fig. 3. The frame sections 13, 14 fit over these end portions of the plates 37 and hold them in place. A pair of metal channel strips 40, 40 are spot welded to each plate 37 in spaced relation to provide the channel-ways for the partition wall 5 as shown in Fig. 2. The channel strips 40, 40 receive the adjacent ends of the inner layer sections as shown. The mounting serves to strengthen the side walls of the container against warping or bulging when wet.

The moss packing which is located within the bait compartment is indicated at 41. A Spaghnum or similar moss may be used and is packed dry in the building of the container. A moss of this character may be employed in that it does not readily generate carbon dioxide gas or heat, will not mat excessively, is water absorbing, and has a fine leaf structure to furnish a small amount of feed for the bait. Peat moss can also be used.

In use the container is filled two or three times with clean, fresh water. The water will soak through in about five minutes. It cannot be soaked too much and seeping through as it does will not retain water long enough to drown the bait. To retain the cooling effect the container is immersed in the river or lake two or three times a day especially on hot days. The side and end walls should be damp to the touch at all times. The cover can be dry or damp. Air should circulate through the container. When it is real hot, and the container is confined in a car, a few ice cubes placed on top of the moss will aid in keeping the contents cool.

The bait container herein described and shown provides an effective bait box for keeping alive and in good condition for extended periods the kind of bait first above mentioned. The container when wetted is kept cool by the evaporation of the moisture from the container walls and being bound in the metal frame which may be of steel is sturdily retained against rough handling and abuse.

The details of construction and arrangement of parts shown and described may be variously changed and modified without departing from the spirit and scope of my invention, except as pointed out in the annexed claims.

I claim as my invention:

1. A live bait container of the character described for fishworms, night crawlers, soft shelled crabs and the like comprising, a removable cover and a wall structure providing a bait receiving compartment within the container, said wall structure being comprised of a self-sustaining, porous, fibrous material to absorb and hold moisture when wetted and exposed within the compartment and on the exterior of the container whereby the moisture carried by said wall structure may evaporate from the container to maintain the compartment and its contents relatively cool and moist to keep the bait alive and in good condition over extended periods, and a moisture absorbent moss material loosely packed within the compartment to provide a habitat for the bait.

2. A live bait container of the character described for fishworms, night crawlers, soft shelled crabs and the like comprising, a wall structure having bottom, upright marginal and top wall members providing a bait receiving compartment within the container, said top wall member constituting a removable cover for the container, each of said wall members being comprised of a self-sustaining, porous, fibrous material to absorb and hold moisture when wetted and exposed within the compartment and on the exterior of the container whereby the moisture carried by the wall structure may evaporate from the container to maintain the compartment and its contents relatively moist and cool to keep the bait alive and in good condition over extended periods, certain of said wall members being increased in thickness to serve as a reservoir for the moisture absorbed by the container, and a moisture absorbent moss material loosely packed within the compartment to provide a habitat for the bait.

3. A live bait container of the character described for fishworms, night crawlers, soft shelled crabs and the like comprising, a removable cover and a wall structure providing a bait receiving compartment within the container, said cover and wall structure being comprised of individually formed panels of a self-sustaining, porous, fibrous material to absorb and hold moisture when wetted, a rigid frame fitting about the container and embracing the outer edges thereof to strengthen and support the container and hold the panels in container forming relation, said frame being in skeleton form to expose the container walls for evaporation of moisture therefrom to maintain the compartment and its contents relatively moist and cool to keep the bait alive and in good condition over extended periods, and a moisture absorbent moss material loosely packed within the compartment to provide a habitat for the bait.

4. A live bait container of the character described for fishworms, night crawlers, soft shelled crabs and the like comprising, a wall structure having bottom, upright marginal and top wall members providing a bait receiving compartment within the container, said top wall member constituting a removable cover for the container, each of said wall members being comprised of a self-sustaining, porous, fibrous material in layer form to absorb and hold moisture when wetted and exposed within the compartment and on the exterior of the container whereby the moisture carried by the wall members may evaporate from the container to maintain the compartment and its contents relatively moist and cool to keep the bait alive and in good condition over extended periods, the upright marginal wall members being comprised of multiple layers of said self-sustaining, fibrous material to serve as a reservoir for the moisture absorbed by the container, and a moisture absorbent moss material loosely packed within the compartment to serve as a habitat for the bait.

5. A live bait container of the character described having top, bottom and upright side and end wall members, said top wall member constituting a removable cover for the container, said wall members providing a bait receiving compartment within the container, and a rigid frame fitting about the outside of the container and holding the wall members in compartment providing relation, said wall members being comprised of layers of self-sustaining, porous, fibrous material, said side and end walls being comprised of inner and outer layers of said fibrous material with the inner layers of the end wall members clamped between the inner layers of the side wall members and all terminating short of the upper edges of the outer layers to provide a seat for the removable cover.

6. A live bait container of the character described having bottom, upright marginal and top wall members, the latter constituting a removable cover for the container, said wall members being comprised of layers of self-sustaining, porous, fibrous material to absorb and hold moisture when wetted, a metal frame fitting about the container on the outer side thereof, said frame comprising upper and lower frame sections fitting about and embracing the upper and the lower edge portions of the container and connecters joining the frame sections at the corners of the container, and an interlocking tongue and aperture connection between the connecters and the frame sections, the wall members at the tongues engaging and holding the same in interlocked connection with the apertures.

7. A live bait container of the character described having bottom and upright marginal wall members and a removable cover, the latter and the wall members providing a bait receiving compartment within the container, said wall members and the cover being comprised of a self-sustaining, porous, fibrous material in layer form to absorb and hold moisture when wetted, a metal frame fitting about the container on the outer side thereof and having upper and lower frame sections and connecters therebetween, and an interlocking tongue and aperture connection between the connecters and the frame sections, the wall members at the tongues holding them in interlocked connection with the apertures, said connecters having a length less than the normal distance between the frame sections whereby the connection of the frame sections with the connecters may be accomplished in assembling the frame by moving the frame sections apart to draw the tongues into interlocking relation with the apertures.

8. A live bait container of the character described comprising, a removable cover and a wall structure providing a bait receiving compartment within the container, said cover and wall structure being comprised of a self-sustaining, porous, fibrous material to absorb and hold moisture when wetted, said wall structure having a shoulder within the container below the upper edges thereof to seat the cover when closed over the compartment in substantially flush relation with the upper edge portions of the container, a strengthening frame on the outer side of the container and embracing the outer edge portions thereof, latch members pivoted on the frame and movable into and out of locking engagement with the cover for releasably locking the same in closed position, said latch members each having stops and finger pieces on its opposite sides, and a bail handle carried by the cover for carrying and lifting the container when the cover is locked in closed position.

9. A live bait container of the character described comprising, a removable cover and a wall structure providing a bait receiving compartment within the container, said cover and wall structure being comprised of a self-sustaining, porous, fibrous material to absorb and hold moisture when wetted, said wall structure having a shoulder within the container below the upper edges thereof to seat the cover when closed over the compartment in substantially flush relation with the upper edge portions of the container, a strengthening frame on the outer side of the container and fitting about and embracing the outer edge portions thereof, and a bail handle for the container, said bail handle being of spring metal and extending across the cover and having its end portions engageable under the frame for releasably locking the cover in closed position and whereby the container may be lifted and carried through the medium of the cover when locked in closed position.

10. A live bait container of the character described comprising, a wall structure having bottom and upright side and end wall members providing a bait receiving compartment within the container, a partition wall member within the compartment for dividing the same, said wall members being comprised of a self-sustaining, porous, fibrous material in layer form to absorb and hold moisture when wetted, and a mounting providing channel-ways for the partition wall member, said mounting including base plates fitting against the inner surfaces of the wall members in opposition within the container and engaging the upper and the lower edges of said wall members, and a frame fitting about the container on the outer side thereof and engaging the upper and the lower end portions of said plates to hold the same in place.

ALBERT E. NORLING.